(12) United States Patent
Lu

(10) Patent No.: US 7,941,318 B2
(45) Date of Patent: May 10, 2011

(54) PUBLIC SPEAKING SELF-EVALUATION TOOL

(75) Inventor: Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 11/865,463

(22) Filed: Oct. 1, 2007

(65) Prior Publication Data

US 2009/0089062 A1    Apr. 2, 2009

(51) Int. Cl.
*G10L 11/00* (2006.01)
*G10L 21/00* (2006.01)

(52) U.S. Cl. ........................... 704/274; 704/270
(58) Field of Classification Search .................. 704/270, 704/274
See application file for complete search history.

(56) References Cited

U.S. PATENT DOCUMENTS

| | | | | |
|---|---|---|---|---|
| 4,472,833 | A * | 9/1984 | Turrell et al. | 381/56 |
| 5,220,639 | A | 6/1993 | Lee | |
| 2002/0086269 | A1 | 7/2002 | Shpiro | |
| 2005/0119894 | A1 | 6/2005 | Cutler et al. | |
| 2006/0106611 | A1 * | 5/2006 | Krasikov et al. | 704/270 |
| 2007/0050190 | A1 | 3/2007 | Washio et al. | |

FOREIGN PATENT DOCUMENTS

| | | |
|---|---|---|
| JP | 11143346 A | 5/1999 |
| JP | 11202895 A | 7/1999 |

OTHER PUBLICATIONS

Ciger et al, "Evaluation of Gaze Tracking Technology for Social Interaction in Virtual Environments", In Proc. of the 2nd Workshop on Modeling and Motion Capture Techniques for Virtual Environments (CAPTECH'04).*
Barber et al., Factors Affecting Users' Choice of Words in Speech-Based Interaction with Public Technology, International Journal of Speech Technology, vol. 2, Number, May 1997, pp. 45-59.
Tseng et al., Collecting Mandarin Speech Databases for Prosody Investigations, Proceedings of the Oriental COCOSDA 2003, International Coordinating Committee on Speeck Databases and Speech I/O System Assessment, Oct. 2003, pp. 225-232.
Nisimura et al., Public Speech-Oriented Guidance System with Adult and Child Discrimination Capability, 2004 IEEE International Conference on Acoustics, Speech, and Signal Processing, Part vol. 1, May 2004, pp. I-433-I-436.

(Continued)

*Primary Examiner* — David R Hudspeth
*Assistant Examiner* — Samuel G Neway
(74) *Attorney, Agent, or Firm* — David A. Dagg

(57) ABSTRACT

A public speaking self-evaluation tool that helps a user practice public speaking in terms of avoiding undesirable words or sounds, maintaining a desirable speech rhythm, and ensuring that the user is regularly glancing at the audience. The system provides a user interface through which the user is able to define the undesirable words or sounds that are to be avoided, as well as a maximum frequency of occurrence threshold to be used for providing warning signals based on detection of such filler or undesirable words or sounds. The user interface allows a user to define a speech rhythm, e.g. in terms of spoken syllables per minute, that is another maximum threshold for providing a visual warning indication. The disclosed system also provides a visual indication when the user fails to glance at the audience at least as often as defined by a predefined minimum threshold.

15 Claims, 3 Drawing Sheets

OTHER PUBLICATIONS http://www.phonetiklabor.de/Phonetiklabor/Inhalt/Unterrichtsmaterial/PDFs/SpeechRhythm.pdf.
http://www.phonetiklabor.de/Phonetiklabor/Inhalt/Ver%F6ffentlichungen/PDFs/VarkoDeltaC.pdf.
http://www.google.com/patents?id=pbF7AAAAEBAJ&dg=speech+calculate+word+per+minute.
http://www.phonetiklabor.de/Phonetiklabor/Inhalt/Unterrichtsmaterial/PDFs/SpeechRhythm.pdf, Sep. 2007.
http://www.phonetiklabor.de/Phonetiklabor/Inhalt/Ver%F6ffentlichungen/PDFs/VarkoDeltaC.pdf, Sep. 2007.
http://www.google.com/patents?id=pbF7AAAAEBAJ&dg=speech+calculate+word+per+minute, Sep. 2007.

* cited by examiner

PUBLIC SPEAKING SELF-EVALUATION TOOL

FIELD OF THE INVENTION

The disclosed system relates generally to automated self evaluation tools, and more specifically to a public speaking self evaluation tool.

BACKGROUND OF THE INVENTION

Public speaking is an important activity for many people today, and is often a required professional activity. However, effective training tools are not available to assist in preparing for public speaking. This is a significant problem for people that need to prepare for an important speech or the like, such as may be delivered either during a conference or a large convention. Accordingly, preparation for public speaking has typically been done in the past using simple devices, such as cameras and/or video cameras. These existing tools have not been particularly effective. Practicing public speaking in front of a mirror is not a natural way to prepare, since the speaker is effectively just talking to themselves. Using a video camera to record a practice run of the speech generally requires the user to continuously rewind and fast forward in order to observe the details of their speech after it has been recorded, e.g. to observe the recording later in order to determine if they have orally stumbled in some way. As a result, the feedback regarding such errors is not immediate and hence less effective.

For the above reasons above and others, it would be desirable to have a new tool that enables a user to conveniently and effectively prepare for public speaking.

SUMMARY OF THE INVENTION

To address the above described and other shortcomings of existing systems, a public speaking self-evaluation tool is disclosed that helps a user practice public speaking in terms of avoiding filler or other undesirable words or sounds, maintaining a desirable speech rhythm, and ensuring that the user is regularly glancing at various places in the audience from time to time. The disclosed system provides a user interface through which the user is able to define the filler or undesirable words or sounds that are to be avoided, as well as a maximum frequency of occurrence threshold to be used for providing warning signals output based on detection of such filler or undesirable words or sounds. Similarly, the user interface allows a user to define a speech rhythm, e.g. in terms of spoken syllables per minute, that is another maximum threshold for providing a visual indication of when the threshold is exceeded. The disclosed system also provides a visual indication when the user fails to glance at the audience at least as often as defined by a minimum threshold.

Because the filler or undesirable words or sounds are user defined, and because the speech rhythm is measured in terms of syllables, the system desirably operates in a language and culture independent fashion.

Thus there is disclosed a tool that enables a user to conveniently and effectively prepare for public speaking.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
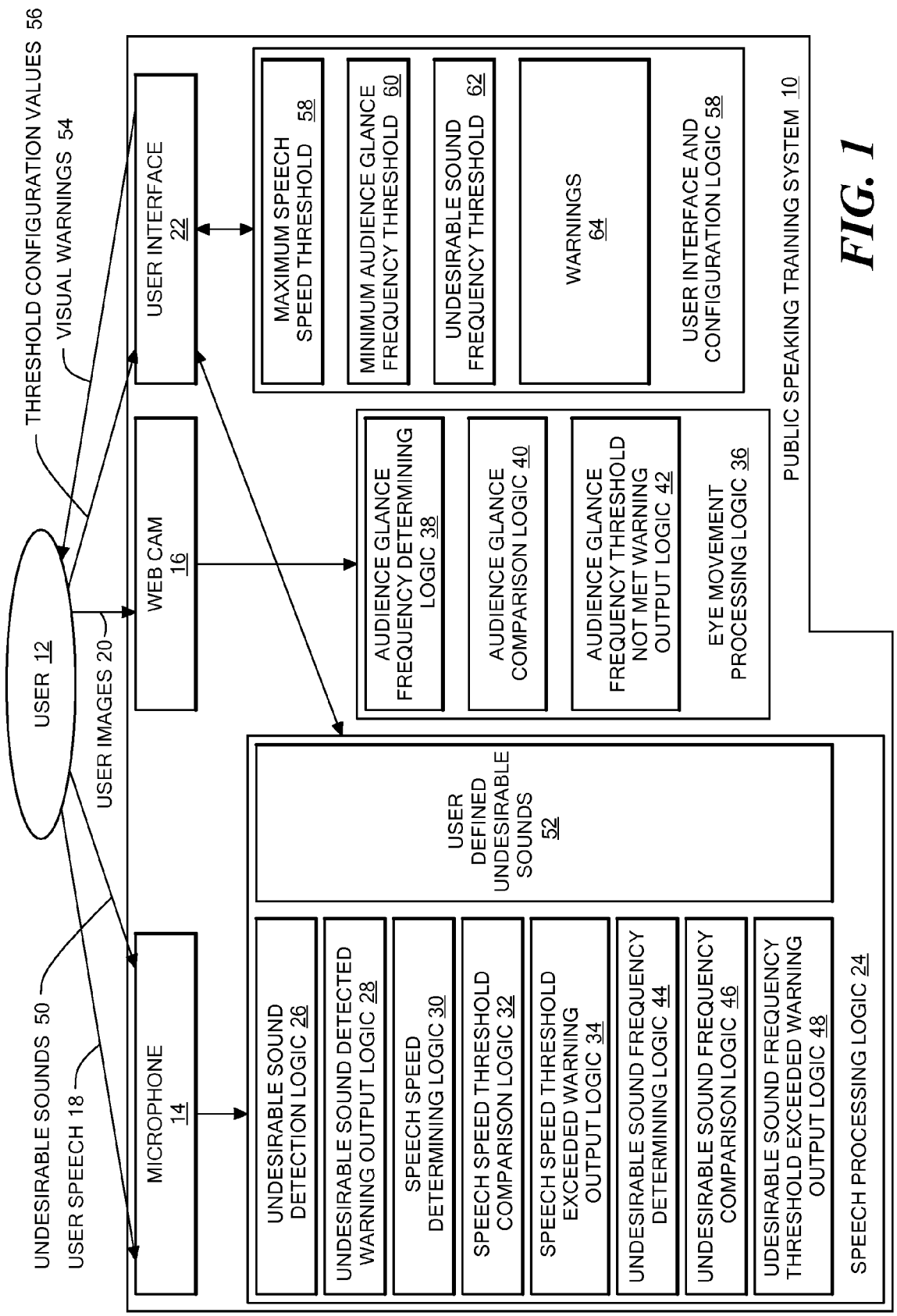
FIG. 1 is a block diagram of hardware and/or software components in an illustrative embodiment of the disclosed system.

FIG. 1 is a block diagram of hardware and/or software components in an illustrative embodiment of the disclosed system. In the example of FIG. 1, a Public Speaking Training System 10 includes an audio data input device, shown for purposes of illustration as the Microphone 14, a visual data input device, shown for purposes of illustration as the Web Cam 16, and a User Interface 22. Public Speaking Training System 10 further includes Speech Processing Logic 24, Eye Movement Processing Logic 36, and User Interface Logic 58. The Speech Processing Logic 24 includes Undesirable Sound Detection Logic 26, Undesirable Sound Detected Warning Output Logic 28, Speech Speed Determining Logic 30, Speech Speed Threshold Comparison Logic 32, Speech Speed Threshold Exceeded Warning Output Logic 34, Undesirable Sound Frequency Determining Logic 44, Undesirable Sound Frequency Comparison Logic 46, and Undesirably Sound Frequency Threshold Exceeded Warning Output Logic 48. The Speech Processing Logic 24 further includes or has access to a number of User Defined Undesirable Sounds 52.

The Eye Movement Processing Logic 36 of FIG. 1 includes Audience Glance Frequency Determining Logic 38, Audience Glance Comparison Logic 40, and Audience Glance Frequency Threshold Not Met Warning Output Logic 42. User Interface and Configuration Logic 58 is shown including a Maximum Speech Speed Threshold 58, a Minimum Audience Glance Frequency Threshold 60, an Undesirable Sound Frequency Threshold 62, and a number of Warnings 64.

During operation of the components shown in the illustrative embodiment of FIG. 1, the User Interface and Configuration Logic 58 generates the User Interface 22, and a User 12 provides Threshold Configuration Values 56 through the User Interface 22. The Threshold Configuration Values 56 may, for example, include user defined values for the Maximum Speech Speed Threshold 58, the Minimum Audience Glance Threshold 60, and the Undesirable Sound Frequency Threshold 62. In one embodiment, the Maximum Speech Speed Threshold 58 provided by User 12 through the User Interface 22 is a maximum number of syllables per second detected within a speech before a warning is output, the Minimum Audience Glance Frequency Threshold provided by User 12 through the User Interface 22 is a minimum number of times per second that a speaker must glance up towards where an audience would be before a warning is output, and the Undesirable Sound Frequency Threshold 62 provided by User 12 through the User Interface 22 is a maximum number of undesirable sounds per minute (or other predetermined time period) that a speaker may say before a warning is output. The specific Warnings 64 may either be preset, system parameters or user defined through the User Interface 22.

The User 12 also indicates through the User Interface 22 that they are going to provide the undesirable sounds to be detected by the Public Training System 10 during a speech. After such indication, the User 12 speaks Undesirable Sounds 50 through the Microphone 14, and the Speech Processing Logic 24 stores representations (e.g. digitized representations) of the Undesirable Sounds 50 spoken by User 12 as the User defined Undesirable Sounds 52.

When User 12 begins a practice speech, shown as User Speech 18, the practice speech is input by the Microphone 14, digitized and stored, and then processed by the Speech Processing Logic 24. The Undesirable Sound Detection Logic 26 analyzes the input speech by identifying individual syllables in the input speech, and then comparing the undesirable syllables to the User Defined Undesirable Sounds 52. While single syllable undesirable sounds may be identified in this way, the disclosed system is not so limited, and multi-syllable words may similarly be defined within the User Defined Undesirable Sounds 52, and identified in the input speech by the Undesirable Sound Detection Logic. For example, a user may wish to be warned when they use filler words or sounds, such as "Ah", "Um", etc., or any other particular type of undesirable word that the user wishes to avoid (e.g. words that they are in the habit of overusing, such as "like", etc.). When the Undesirable Sound Detection Logic 26 detects an undesirable word in the input speech, the Undesirable Sound Detected Warning Output Logic 28 causes a warning to appear in the User Interface 22 indicating to the user that an undesirable sound or word was detected in the input speech (e.g. through a light, sound, text warning, etc.), and potentially also indicating/displaying to the user the detected undesirable word.

Further during operation of the embodiment shown in FIG. 1, the Speech Speed Determining Logic 30 operates to continuously determine a speed at which the input speech is being delivered. For example, in one embodiment, the Speech Speed Determining Logic 30 counts the number of syllables identified in the input speech, and continuously determines a current syllable rate for the input speech, e.g. based on the number of syllables in the input speech detected during each time period indicated by a timer configured for this purpose. As each new current speech speed is determined (e.g. at the end of each time period during which speech syllables are counted), the current speech speed is compared to the Maximum Speech Speed Threshold 58 by the Speech Speed Threshold Comparison Logic 32. In the event that the current speech speed is determined to be greater than the Maximum Speech Speed Threshold 58, the Speech Speed Threshold Exceeded Warning Output Logic 34 is triggered by the Speech Speed Threshold Comparison Logic 32 to output a warning through the User Interface 22 indicating that the Maximum Speech Speed Threshold 58 has been exceeded.

Also during operation of the embodiment shown in FIG. 1, the Undesirable Sound Frequency Determining Logic 44 operates to continuously determine a frequency at which the User Defined Undesirable Sounds 52 are detected in the input speech. For example, in one embodiment, the Undesirable Sound Frequency Determining Logic 44 counts the number of User Defined Undesirable Sounds 52 identified in the input speech, and continuously determines a current frequency for undesirable sounds detected in the input speech, e.g. based on the number of undesirable sounds in the input speech detected during each time period indicated by a timer configured for this purpose. As each new current frequency for undesirable sounds is determined (e.g. at the end of each time period during which undesirable sounds are counted), the current undesirable sound frequency is compared to the Undesirable Sound Frequency Threshold 62 by the Undesirable Sound Frequency Comparison Logic 46. In the event that the current undesirable sound frequency is determined to be greater than the Undesirable Sound Frequency Threshold 62, the Undesirable Sound Frequency Threshold Exceeded Warning Output Logic 48 is triggered by the Undesirable Sound Frequency Comparison Logic 46 to output a warning through the User Interface 22 indicating that the Undesirable Sound Frequency Threshold 62 has been exceeded.

The visual data of the User 12 giving a speech is shown in FIG. 1 as the User Images 20 that are captured by a visual data input device, such as the Web Cam 16. The captured user images are processed (including any necessary digitization and/or any other pre-processing as may be necessary) to determine whether the User 12 is looking up with sufficient frequency, as they should look up towards different points/audience members in an audience during delivery of an actual speech. For example, the Audience Glance Frequency Determining Logic 38 monitors eye movements of User 12, and operates to continuously determine a frequency at which the User 12 looks up from his or her speaking materials, laptop, etc., at a sufficient angle, or towards an area in which an audience would be located. For example, in one embodiment, the Audience Glance Frequency Determining Logic 38 counts the number times User 12 looks up at a sufficient angle from his or her speech materials, or towards an area in which an audience would be located, and continuously determines a current frequency of audience glances during the input speech, e.g. based on the number of time User 12 looks up during each time period indicated by a timer configured for this purpose. As each new current audience glance frequency is determined (e.g. at the end of each time period during which audience glances are counted), the current audience glance frequency is compared to the Minimum Audience Glance Frequency Threshold 60 by the Audience Glance Comparison Logic 40. In the event that the current audience glance frequency is determined to be less than the Minimum Audience Glance Frequency Threshold 62, the Audience Glance Frequency Threshold Not Met Warning Output Logic 42 is triggered by the Audience Glance Comparison Logic 40 to output a warning through the User Interface 22 indicating that the Minimum Audience Glance Frequency Threshold 60 is not being met.

The Public Speaking Training System 10 may include or consist of any specific type of electronic device or devices. For example, the Public Speaking Training System 10 may include a dedicated or multipurpose computer system or other intelligent electronic device, such as a desktop, laptop, or palmtop computer system, or a personal digital assistant, cell phone, or other electronic device. The Public Speaking Training System 10 of FIG. 1 may include or control a display device capable of displaying a graphical user interface (e.g. the User Interface 22) to a local user (e.g. User 12), such as a liquid crystal display (LCD), cathode ray tube (CRT), interferometric modulator display (IMOD), light emitting diode (LED), or the like.

Those skilled in the art will recognize that the Speech Processing Logic 24, Eye Movement Processing Logic 36, and User Interface and Configuration Logic 58 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Public Speaking Training System 10 may include one or more processors, and program storage, such as memory, for storing program code executable on such processors, as well as input/output devices and/or interfaces.

Figure 2:
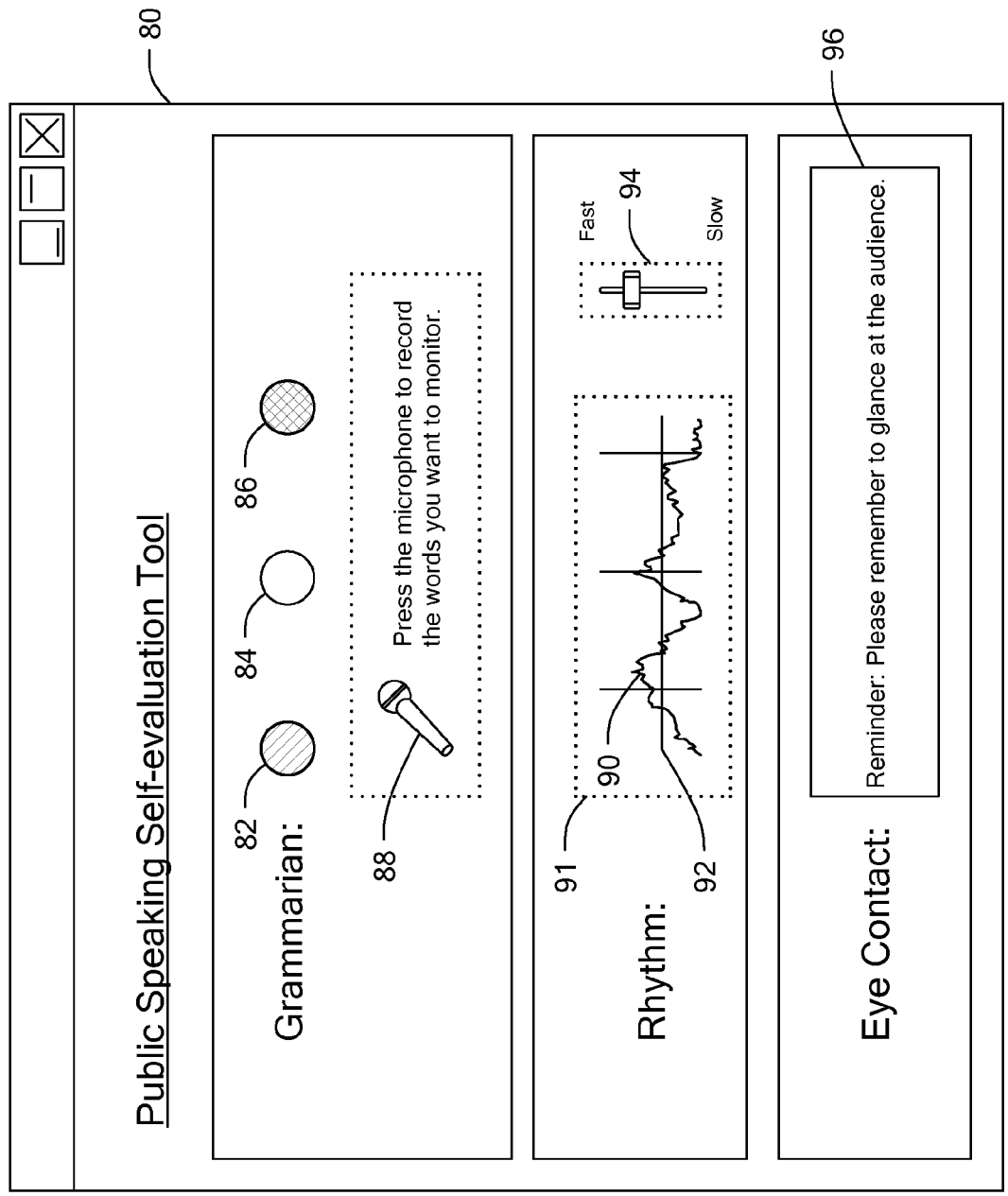
FIG. 2 is a simplified screen shot showing an example of a user interface provided by the disclosed system.

FIG. 2 is a simplified screen shot showing an example of a User Interface 80 generated by the disclosed system. The User Interface 80 of FIG. 2 is an example of the User Interface 22 shown in FIG. 1. The User Interface 80 includes three visual signals related to detection of undesirable sounds or words, shown as a green light 82, a yellow light 84, and a red light 86. In the illustrative embodiment of FIG. 2, the disclosed system causes the green light 82 to be lit while the user is speaking and has not spoken any undesirable words either from the beginning at the speech, or for a predetermined time period. The disclosed system causes the yellow light 84 to be lit or flash when it detects that the user has spoken an undesirable sound or word. This provides the user with immediate visual feedback regarding his or her use of undesirable sounds or words. When the frequency with which the user speaks undesirable sounds or words exceeds the user defined maximum undesirable sound frequency threshold, the disclosed system causes the red light 86 to be lit, indicating that the undesirable sound frequency has reached an unacceptable level.

Further in the User Interface 80, a user selectable microphone icon 88 enables the user to record undesirable sounds that are to be detected while the user practices their speech. A line 90 is continuously updated in box plot 91 to show the current speed of the user's speech, e.g. in terms of syllables per second. The user defined maximum speech speed threshold is visually displayed by the line 92. Thus when the user's speech speed exceeds the maximum speech speed threshold line 92, the line 90 goes above the maximum speech speed threshold line 92, thus providing visual warning to the user that their speech speed is in excess of the maximum speech speed threshold. A slider-type user interface display object 94 in the illustrative user interface 80 is provided to allow the user to set the maximum speech speed threshold. A warning 96 is displayed by the disclosed system in response to detecting that the frequency at which the user is glancing up as if they were glancing up at an audience is not as high as the minimum audience glance frequency threshold.

In order to support situations in which a user is taping themselves while using the disclosed system, the specific warnings provided by the disclosed system may be selectively disabled. For example, one or more of the warning shown in the user interface 80 may be disabled by the user through buttons or the like provided through the User Interface 22 of FIG. 1. Such a feature is advantageous in the case where a specific type of warning would interfere with the taping of the speech, e.g. a flashing light that might inadvertently be recorded.

Moreover, the specific types of visual warnings shown in the illustrative User Interface 80 of FIG. 2 are given only for purposes of example, and the disclosed system may be embodied and/or configured to use any other specific types of visual warnings or alternatively may use audible warnings.

Figure 3:
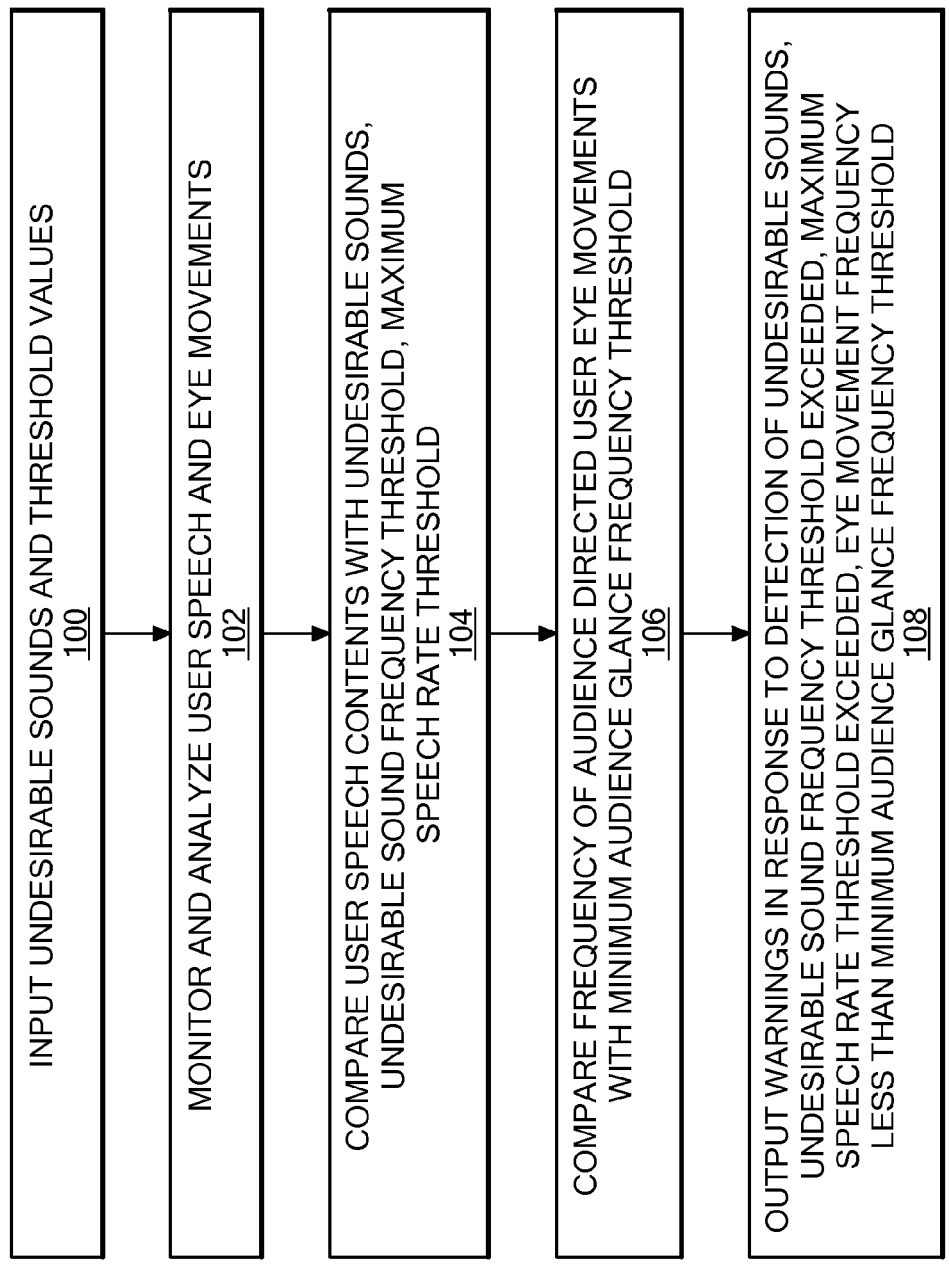
FIG. 3 is a flow chart showing steps performed by an illustrative embodiment of the disclosed system during operation.

FIG. 3 is a flow chart showing steps performed by an illustrative embodiment of the disclosed system during operation. At step 100, a user inputs the undesirable sounds and words to be detected, and threshold values with regard to undesirable sound frequency, speech speed and audience glancing. At step 102, the disclosed system monitors and analyzes the user's speech and eye movements to determine whether the user is speaking any undesirable sounds or words, exceeding a maximum undesirable sound frequency threshold, exceeding a speech speed threshold, and/or not meeting a minimum audience glance frequency threshold at steps 104 and 106. At step 108 the disclosed system operates to output warnings in response to detection of undesirable sounds, undesirable sound frequency threshold being exceeded, maximum speech rate threshold being exceeded, and/or eye movement frequency being less than the minimum audience glance frequency threshold.

The disclosed system uses voice recognition and eye tracking technologies to help a user improve his or her speech delivery. Various specific techniques used in speech recognition technology may be applied in the disclosed system to process the user's speech (e.g. by Speech Processing Logic 24). Such techniques may be from systems referred to as automatic speech recognition or computer speech recognition systems that involve converting a speech signal into a sequence of words, by means of an algorithm implemented in hardware components and/or as a computer program. Moreover, the disclosed system may be embodied such that the a user can use speech recognition technology to monitor whether user speaks any undesirable words (e.g. "Ah", "Um", etc.), or any other user-defined undesirable sounds or words. The disclosed system can further be conveniently configured and/or trained to operate based on an individual user's voice. Such user specific configuration is particularly useful for users whose language is not English, since undesirable sounds or words in the non-English language may not be the same as those typically used by English speakers (e.g. "Ah", "Um", etc.). For example, a Chinese speaking user may wish to configure the system to detect place holder sounds that are common in Chinese, e.g. "Eng" or the like. Moreover, the disclosed system may further be embodied such that a tone analysis component is provided in the undesirable sound detection logic 26, so that a user can provide tone-specific undesirable sounds or words that are detected and counted by the disclosed system, e.g. when the user is speaking in a tonal language, such as Mandarin.

The syllable counting performed by an embodiment of the disclosed system may, for example, employ techniques for recognizing syllables in the input speech that have been applied in the context of speech recognition systems, such as, for example, syllable recognition techniques such as those described in U.S. Pat. No. 5,220,639 and the like.

The eye tracking in the disclosed system may similarly be provided through any specific type of eye tracking technique. Such techniques are known to be able to track a user's eye movements in order to measure either the point of gaze (i.e. where the user is looking), and/or the motion of the eye itself relative to the head. For example, some eye-tracking designs that may be used involve video-based eye trackers, in which a camera focuses on one or both eyes and records their movement. By using such eye tracking techniques, the disclosed system can observe the eye movement of the user to help the user obtain with good public speaking skills such as browsing the audience from time to time. For example, by using the Web camera 16 of FIG. 1 or the like, and as described above, the disclosed system can thus determine whether the user has made appropriate eye movements during a certain period of time (e.g. as measured by a timer or the like).

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operation and/or output signal (i.e. warning).

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

I claim:

1. A method for helping a user practice public speaking, comprising:
   inputting a user's speech;
   detecting, responsive to said input user's speech, each occurrence of a sound in said user's speech that matches at least one sound defined in a predetermined set of undesirable sounds;
   responsive to each said detection of said each said occurrence of said sound in said user's speech that matches at least one sound defined in said predetermined set of undesirable sounds, outputting an undesirable sound detected warning;
   determining, responsive to said input user's speech, a speech speed;
   comparing said speech speed to a predetermined maximum speech speed threshold;
   responsive to said speech speed exceeding said predetermined maximum speed threshold, outputting a speech speed exceeded warning;
   inputting eye movements of said user;
   responsive to said input eye movements of said user, determining when said user glances up and maintaining an audience glance frequency measurement indicating a frequency at which said user glances up;
   comparing said audience glance frequency measurement with a predetermined minimum audience glance frequency threshold; and
   responsive to said audience glance frequency measurement falling below said predetermined minimum audience glance frequency threshold, outputting an audience glance frequency threshold not met warning.

2. The method of claim 1, further comprising:
   maintaining an undesirable sound frequency measurement indicating a frequency of occurrence of sounds in said user's speech matching at least one sound defined in said predetermined set of undesirable sounds;
   comparing said undesirable sound frequency measurement to a predetermined undesirable sound frequency threshold; and
   responsive to said undesirable sound frequency measurement exceeding said undesirable sound frequency threshold, outputting an undesirable sound threshold exceeded warning.

3. The method of claim 2, wherein said inputting of said user's speech includes receiving said user's speech through a microphone in analog form, and storing a digital representation of said user's speech in a system memory.

4. The method of claim 3, further comprising generating a user interface allowing said user to input said predetermined set of undesirable sounds.

5. The method of claim 4, wherein said undesirable sound detected warning comprises a first visual warning provided through said user interface.

6. The method of claim 5, wherein said user interface further allows said user to input said predetermined undesirable sound frequency threshold.

7. The method of claim 6, wherein said undesirable sound threshold exceeded warning comprises a second visual warning provided through said user interface.

8. The method of claim 7, wherein said speech speed comprises a syllable frequency in said input user's speech.

9. The method of claim 8, wherein said user interface further allows said user to input said predetermined maximum speech speed threshold.

10. The method of claim 9, wherein said user interface allows said user to input said predetermined maximum speech speed threshold through a slider user interface display object.

11. The method of claim 10, wherein said user interface further includes a dynamically updated graph representation of said syllable frequency in said input user's speech.

12. The method of claim 11, wherein said audience glance frequency threshold not met warning comprises a text warning displayed in said user interface.

13. A system for helping a user practice public speaking, comprising:
   speech input circuitry for inputting a user's speech;
   undesirable sound detection logic for detecting, responsive to said input user's speech, each occurrence of a sound in said user's speech that matches at least one sound defined in a predetermined set of undesirable sounds;
   undesirable sound detected warning output logic for, responsive to each said detection of said each said occurrence of said sound in said user's speech that matches at least one sound defined in said predetermined set of undesirable sounds, outputting an undesirable sound detected warning;
   speech speed determining logic for determining, responsive to said input user's speech, a speech speed;

speech speed threshold comparison logic for comparing said speech speed to a predetermined maximum speech speed threshold;

speech speed threshold exceeded warning output logic for, responsive to said speech speed exceeding said predetermined maximum speed threshold, outputting a speech speed exceeded warning;

eye movement tracking circuitry for inputting eye movements of said user;

audience glance frequency determining logic for, responsive to said input eye movements of said user, determining when said user glances up and maintaining an audience glance frequency measurement indicating a frequency at which said user glances up;

audience glance comparison logic for comparing said audience glance frequency measurement with a predetermined minimum audience glance frequency threshold; and audience glance frequency threshold not met warning output logic for, responsive to said audience glance frequency measurement falling below said predetermined minimum audience glance frequency threshold, outputting an audience glance frequency threshold not met warning.

14. A computer program product comprising:

a non-signal computer readable medium, said computer readable medium having program code for helping a user practice public speaking stored thereon, said program code comprising:

program code for detecting, responsive to input user's speech, each occurrence of a sound in said user's speech that matches at least one sound defined in a predetermined set of undesirable sounds;

program code for, responsive to each said detection of said each said occurrence of said sound in said user's speech that matches at least one sound defined in said predetermined set of undesirable sounds, outputting an undesirable sound detected warning;

program code for determining, responsive to said input user's speech, a speech speed;

program code for comparing said speech speed to a predetermined maximum speech speed threshold;

program code for, responsive to said speech speed exceeding said predetermined maximum speed threshold, outputting a speech speed exceeded warning;

program code for, responsive to input eye movements of said user, determining when said user glances up and maintaining an audience glance frequency measurement indicating a frequency at which said user glances up;

program code for comparing said audience glance frequency measurement with a predetermined minimum audience glance frequency threshold; and program code for, responsive to said audience glance frequency measurement falling below said predetermined minimum audience glance frequency threshold, outputting an audience glance frequency threshold not met warning.

15. A system for helping a user practice public speaking, comprising:

means for inputting a user's speech;

means for detecting, responsive to said input user's speech, each occurrence of a sound in said user's speech that matches at least one sound defined in a predetermined set of undesirable sounds;

means, responsive to each said detection of said each said occurrence of said sound in said user's speech that matches at least one sound defined in said predetermined set of undesirable sounds, for outputting an undesirable sound detected warning;

means for determining, responsive to said input user's speech, a speech speed;

means for comparing said speech speed to a predetermined maximum speech speed threshold;

means, responsive to said speech speed exceeding said predetermined maximum speed threshold, for outputting a speech speed exceeded warning;

means for inputting eye movements of said user;

means, responsive to said input eye movements of said user, for determining when said user glances up and maintaining an audience glance frequency measurement indicating a frequency at which said user glances up;

means for comparing said audience glance frequency measurement with a predetermined minimum audience glance frequency threshold; and means, responsive to said audience glance frequency measurement falling below said predetermined minimum audience glance frequency threshold, for outputting an audience glance frequency threshold not met warning.

* * * * *